Dec. 5, 1944.   E. W. KELLOGG   2,364,148
SOUND FILM DRIVE MECHANISM
Filed Feb. 13, 1942   2 Sheets-Sheet 1
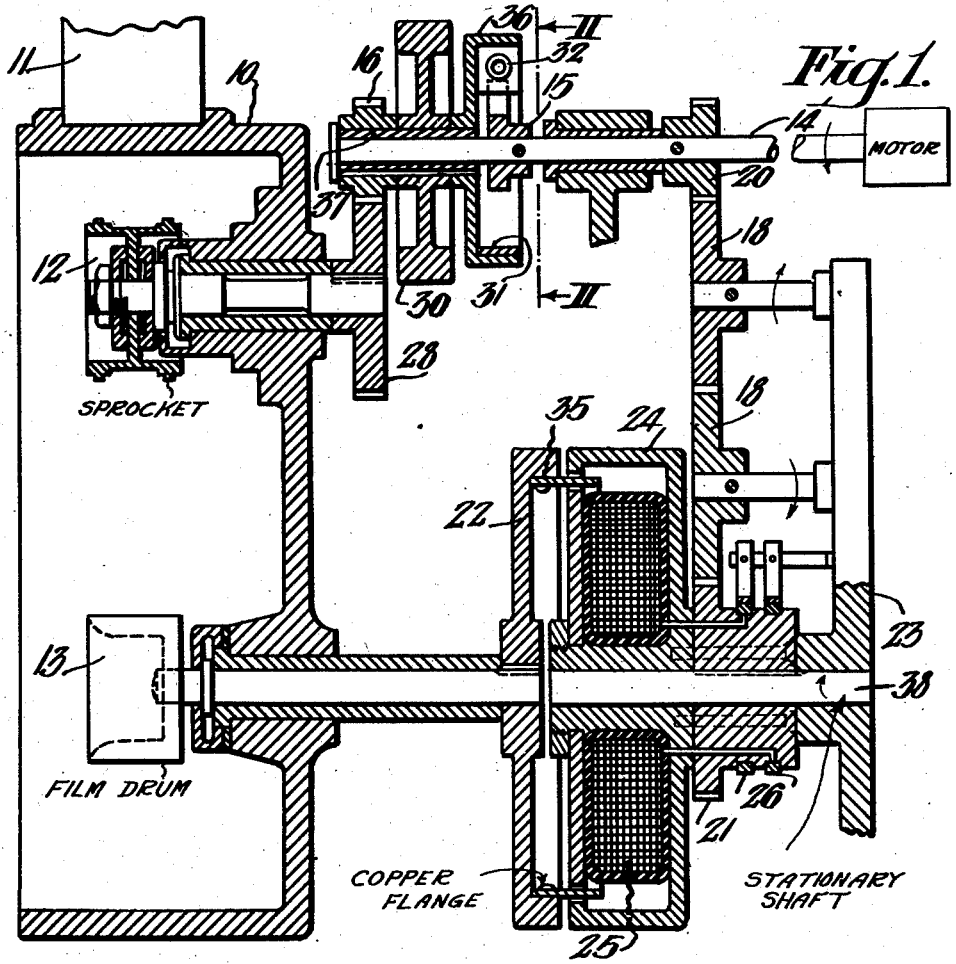
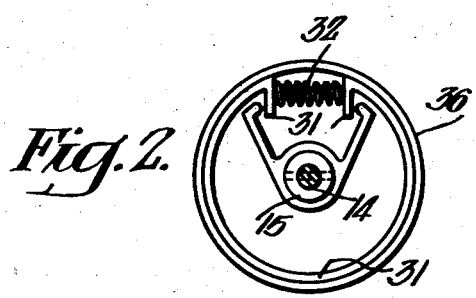
Inventor
Edward W. Kellogg
By
C. D. Tuska
Attorney Dec. 5, 1944.  E. W. KELLOGG  2,364,148
SOUND FILM DRIVE MECHANISM
Filed Feb. 13, 1942  2 Sheets-Sheet 2
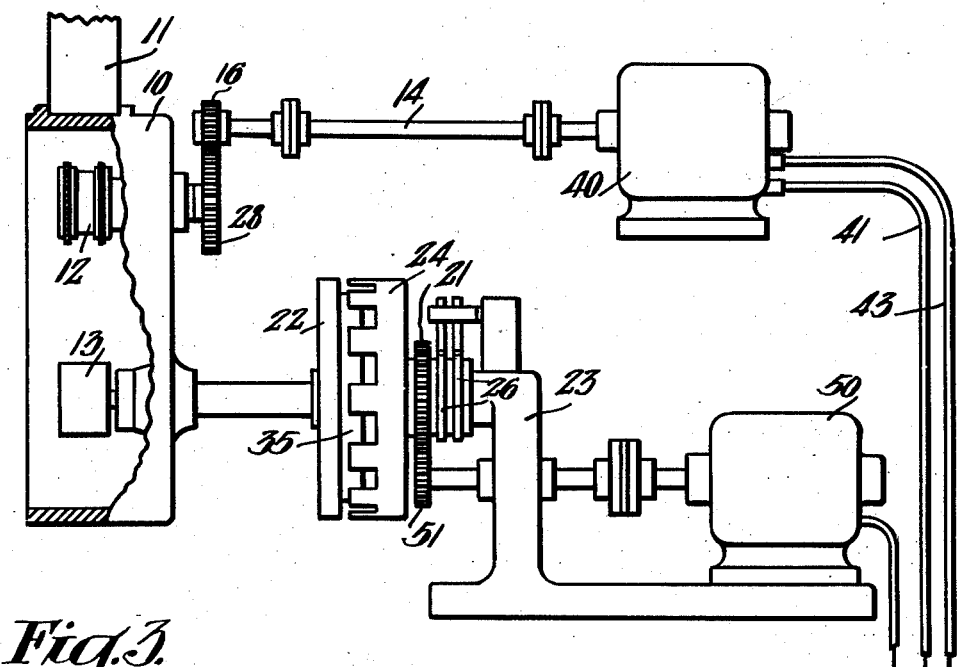
Fig.3.
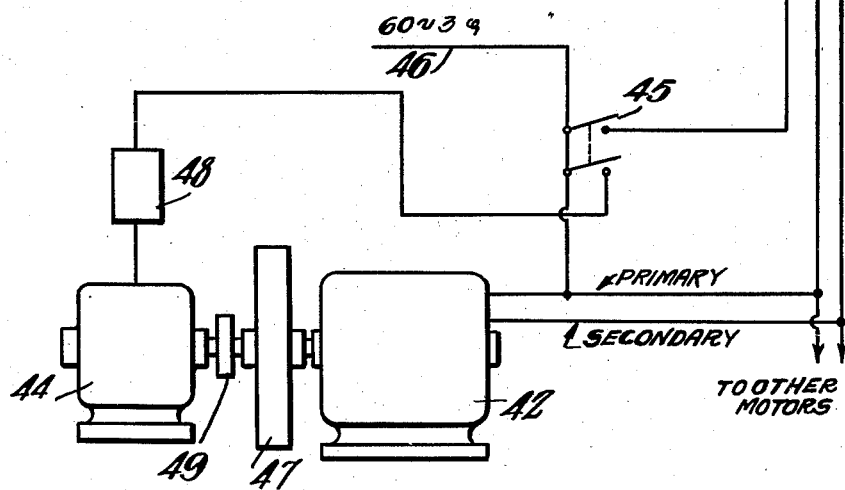
Inventor
Edward W. Kellogg
By
Attorney Patented Dec. 5, 1944

2,364,148

UNITED STATES PATENT OFFICE 2,364,148

SOUND FILM DRIVE MECHANISM

Edward W. Kellogg, Indianapolis, Ind., assignor to Radio Corporation of America, a corporation of Delaware Application February 13, 1942, Serial No. 430,777

7 Claims. (Cl. 271—2.3)

This invention relates to film driving mechanism and is an improvement on the apparatus described and claimed in my Patents Nos. 1,899,571, 1,969,755 and Reissue 19,270. It is also an improvement on the apparatus described and claimed in the application of Harold Backus, Serial No. 408,750, filed August 29, 1941.

The apparatus described in my said earlier patents involves a film drum which is driven through a continuously and aperiodically yieldable connection which causes a very uniform movement of the film past a recording or reproducing point while the average speed of the film is determined by a positively driven sprocket.

The apparatus is usually driven by a synchronous motor or an equivalent device and, as a consequence, the sprocket is brought rapidly to speed, while an appreciable time elapses before the film drum reaches the corresponding speed. It is impossible to gear the film drum and sprocket rigidly together and thereby cause them to accelerate at the same rate, for two reasons:

The length of the film for a given number of sprocket holes varies with the age of the film and with its history as to conditions of temperature and humidity. This fact necessitates driving the film drum over which the film is carried without slippage at a speed corresponding to the actual film length, whereas the film is fed to and from the apparatus by a sprocket which maintains the sprocket holes in proper synchronism with other films or devices such as motion picture film and cameras or projectors which may be operated concurrently therewith.

The film must be moved by the drum past the recording or reproduction point hereinafter referred to as the translation point, at a very uniform speed. The use of gearing or any equivalent positive driving means for the drum tends to introduce irregularities of film motion of very considerable magnitude. Moreover any direct driving system would not permit the drum to adjust its own speed to the necessary value to take care of variations in film shrinkage without slipping. I have found, as described and claimed in my patents previously referred to, that the most satisfactory way to drive the film drum is to couple it to a source of power such as an electric motor, by means of a continuously and aperiodically yieldable connection such as a viscous drive or a magnetic induction drive either of which produces very uniform operation under normal operating conditions, but neither of which provides a high starting torque. The usual manner of applying this principle is to employ a rotating magnet which reacts on a flange of conducting material attached to the drum flywheel. The magnet is driven through gearing by the same motor which drives the sprocket. Under these conditions, the magnet and sprocket reach full speed at the same time, but the drum lags behind, and reaches full speed only when the combined frictional effect of the slipping film and the forward drag of the magnets have persisted long enough to complete the acceleration of the flywheel mass. In the meantime in equipment as at present used, the sprocket or sprockets are operating at full speed, almost from the instant the motor switch is closed, thereby making the film travel at full speed during the time that the drum is coming up to speed, and thereby wasting several feet of film in the case of a recorder, for the recording cannot begin until complete equilibrium is reached.

The benefit from my invention is not confined to saving film. It also saves wear on the film in sliding over the drum. This wear is of no consequence in the case of leader stock, but if the same principle of construction is applied to a projector, which by some accidental cause has been stopped in the middle of the picture, the damage to the film may be more serious. Most important, however, is the improved stability which may be attained by the use of the present invention. Machines with auxiliary drive such as herein described, are usually designed for "overdrive." With no film in the machine the drum would run faster than normal. With the film in the machine the film pulls back on the drum and maintains the drum speed at the correct value. The advantage of this overdrive arrangement, as explained in my previous patent (No. 1,899,571) is that the guiding of the film is better, and the stability is better when the film is tight where it approaches the drum and slack on the side where it leaves the drum. This superior stability of course applies under running conditions when the drum has acquired full speed. During the starting of machines of the present type, the reverse situation exists, namely, instead of holding back on the drum the film is attempting to bring it up to speed, which means tight film on the side where the film leaves the drum. Instability sometimes occurs under these conditions as explained in a technical paper which I published in the Journal of Society of Motion Picture Engineers, November, 1930, and the film has been known to run off the end of the drum. While this situation has been controlled in present commercial machines, it would be better to prevent such a situation ever arising, and greater freedom of design can be used, if it is known that such a condition of instability cannot occur. If the auxiliary drive is capable of accelerating the drum at a faster rate than the acceleration at the sprocket, the film will at all times be pulling back on the drum, even during starting. It is to accomplish this purpose that the aforementioned application of H. A. Backus and my present application are directed.

In the apparatus of the Backus application above referred to, the starting times of the drum and the sprockets are made to more nearly approach equality.

The present apparatus improves on that of the said patents and the Backus application in that all of the filtering inherent in the magnetic drive is retained while means are provided for limiting the rate at which the sprocket is accelerated without correspondingly limiting the acceleration of the magnet. This decreases the rate of acceleration of the sprockets to more nearly correspond with the rate of acceleration of the film drum and as a consequence only a relatively small quantity of film is driven through the apparatus between the instant of starting and the time the drum and sprocket both reach operating speed.

One object of the invention is to provide an improved film drive mechanism.

Another object of my invention is to provide a film drive mechanism which has a high degree of stability during starting as well as at other times.

Another object of the invention is to provide a film drive mechanism which will prevent loss of film in the starting of the apparatus.

Another object of the invention is to provide a film driving mechanism having a synchronous sprocket drive and a yieldable drum drive in which the rate of acceleration of the sprocket drive is limited.

Another object of the invention is to provide film driving mechanism having synchronous sprocket drive and a yieldable drum drive in which the torque applicable to the synchronous sprocket drive is limited.

Other and incidental objects of the invention will be apparent to those skilled in the art from a reading of the following specification and an inspection of the accompanying drawings, in which Figure 1 is a vertical section through the recording apparatus, Figure 2 is a view taken on the line II—II of Fig. 1 and looking in the direction indicated by the arrows, and Figure 3 is a schematic representation of a modification of my invention.

Referring first to Fig. 1 the sound film apparatus which in the present instance is illustrated as a recorder is provided with the usual light-tight casing 10. Film from the magazine II supported on the top of the casing passes downwardly around the sprocket 12, then around the film drum 13 and back around the sprocket 12 whence it returns to the takeup reel in the film magazine II. The apparatus may be provided with the usual pressure rollers and guide rollers which are not material to the present invention and are therefore not illustrated.

Power is applied to the device through the shaft 14, the source of power being for example, an electric motor of the synchronous type. The shaft 14 carries a gear 20 which drives the induction coupling device 24 through intermediate gears 18 and gear 21 which is directly connected to induction device 24. No slipping is involved in this drive system. Thus the induction device 24 picks up speed as fast as the motor which drives shaft 14. Solidly mounted on shaft 14 is the driving element 15 of a torque limiting clutch shown in more detail in Fig. 2 and further described hereinafter. The driven or flange member of said torque limiting clutch is shown at 36. Solidly connected to the clutch member 36 are the flywheel 30 and gear 16; these three members being fixed to a single sleeve 37, which is freely rotatable on shaft 14 except for the connection through the clutch 15, 36. The gear 16 meshes directly with gear 29 which drives the sprocket 12. The inertia of the flywheel 30 is so proportioned, relative to the torque which the clutch 15, 36 is designed to transmit, that the sprocket 12 comes gradually up to speed, requiring a predetermined time interval to reach full speed. Thereafter there is no further slipping of the clutch and the sprocket drive is strictly in synchronism, as determined by the synchronous driving motor. In other words, the clutch and flywheel provide a coupling between the driving means and the sprocket wherein the torque is directly related to the speed of the driven sprocket.

The aperiodically yieldable auxiliary driving system for the drum comprises a flywheel 22 on which is mounted a copper flange 35 which is located within the airgap of an electromagnet 24 excited through the winding 25 which is supplied with the direct current through the slip rings 26. The magnet 24 with its gear and slip rings is rotatable on the stationary shaft 38 mounted in supporting member 23. Directly connected to the magnet 24 is the gear 21 which is driven from the shaft 14, without any slipping, through gear 20 and intermediate gears 18, 18. The magnet therefore reaches full speed as soon as the motor driving shaft 14 is up to full speed, and this is relatively quickly as compared with the acceleration of the sprocket 12, and of the drum 13. The large rate of slip between the magnet 24 and the flange 35 results in a strong accelerating torque to bring the drum flywheel 22 up to speed. Thus the magnet and flange provide a coupling wherein the torque is inversely related to the speed of the driven film drum. The torque limiting clutch which is illustrated in more detail in Fig. 2 is also described and claimed in my Patent No. 2,050,613, issued August 11, 1936. In this clutch the driving member 15 contacts the clutch shoe 31 which is expanded against the interior of the clutch drum 36 by an appropriate spring 32. The elasticity of the shoe 31 and of the spring 32 are so chosen that under normal operating conditions of the apparatus no slippage occurs between the members 31 and 36. When, however, the torque exceeds a predetermined value the spring 32 is compressed slightly and the shoe 31 slips in relation to the driven member 36. By appropriate choice of the flywheel 30 and of the stiffness or compression of the spring 32, this device may be so constructed that the sprocket 12 accelerates at a rate slightly less than that of the drum 13.

It will be evident that the employment of a slipping clutch between a synchronous motor and the sprocket will result in an uncertain amount of slip during starting. Otherwise stated the relation between the number of revolutions of the motor and those of the sprocket during the acceleration period is not definitely known. Therefore in the form thus far described, my invention does not lend itself to certain applications wherein it is necessary to start a number of film machines in complete synchronism from standstill. The driving of film machines in complete synchronism from start is usually accomplished by means of a set of motors having polyphase voltage supplied to primary windings and having secondary windings interconnected. Such motors are frequently called "Selsyn" motors. A different but closely related embodiment of my invention illustrated in Fig. 3 is applicable to these requirements. Each film machine to be so synchronized, is supplied with two motors, one a Selsyn motor directly geared, without slip clutch, to the sprocket, and a separate motor having quick starting characteristics serving to drive the magnets or other auxiliary drive from the drum. This second motor would not need necessarily to be of the synchronous type. The rotation of the Selsyn motors driving this and the other machines is controlled by a certain master Selsyn "generator" sometimes called a "distributor" which is in turn driven by a motor of sufficient size to supply all of the mechanical force needed for the entire group of machines to be synchronously driven. This main driving motor must run at very uniform speed, and is frequently itself of the synchronous type. The acceleration of the Selsyn generator would, in the application of my present invention, be kept to a reasonably low rate either by applying reduced voltage to the driving motor during starting or by providing a slip clutch between motor and generator, and probably also by employment of a flywheel of adequate size on the generator shaft. The characteristics of the two driving systems should be such that in the absence of the film in the machine to hold the drum back, the drum speed would always be above that corresponding to the sprocket speed at the time.

Figure 3 illustrates the form of invention in which the sprocket 12 is driven without slip from a motor 40 of the "Selsyn" type as previously described. The motor 40 is supplied with polyphase alternating current through a group of conductors 41 (indicated by a single line). These conductors extend to the generator 42 and to such other motors as are to be driven in strict synchronism. The secondary windings of the motors and generator are also connected together through another group of conductors indicated at 43. These connections 41 and 43 are established between the machines before starting, and serve to lock the machines together at standstill as well as during running. In order to start the machines, the driving motor 44 is started by closing the switch 45 which supplies power to the driving motor from the polyphase source indicated at 46. In order that the group of sprocket driving motors may not be accelerated too rapidly the controlling motor generator set 44—42 is provided with a large flywheel 47 and may also be equipped with a starting device 48 which either by manual or by automatic control applies reduced voltage to the motor during the starting period. A slip clutch 49, preferably of the kind already described, may also be provided between the motor 44 and the flywheel 47 and generator 42. Simultaneously with the starting of the main driving motor 44 the switch 45 closes the power supply to motor 50 which is of a type which comes up to speed rapidly. Motor 50 is connected through the gears 51 and 21 to the rotating magnet 24 which is inductively coupled to the flange 35 and the drum flywheel 22 and drum 13. This provides for bringing the magnet up to speed rapidly and thereby also bringing the drum up to speed as rapidly as needed, while the synchronous "Selsyn" motor 40, comes more gradually up to speed.

I claim as my invention:

1. Film feeding apparatus including a drive member, a film drum, inverse torque-to-speed responsive continuously and aperiodically yieldable means connecting said drum to said drive member, a sprocket for feeding film to and from said drum, and direct torque-to-speed responsive means interposed between said sprocket and said drive member for accelerating said sprocket at a rate slower than the acceleration of said drive member.

2. Film feeding apparatus including a drive member, a film drum, inverse torque-to-speed responsive continuously and aperiodically yieldable means connecting said drum to said drive member, a sprocket for feeding film to and from said drum, and a direct torque-to-speed responsive clutch interposed between said sprocket and said drive member for simultaneously accelerating said sprocket and drum at rates which have a predetermined relation.

3. Film feeding apparatus including a drive member, a film drum, inverse torque-to-speed responsive continuously and aperiodically yieldable means connecting said drum to said drive member, sprocket means for feeding film to and from said drum, and means including a direct torque-to-speed responsive clutch and a flywheel interposed between said drive means and said sprocket means for accelerating said sprocket at a slower rate than that of said drive member and said drum.

4. Film feeding apparatus including a drive member, a film drum, inverse torque-to-speed responsive continuously and aperiodically yieldable means connecting said drum to said drive member, a sprocket for feeding film to and from said drum, and a direct torque-to-speed responsive clutch connecting said sprocket to said drive member for varying the starting torque of the sprocket and maintaining said drive member and sprocket in fixed relation during normal operation.

5. Film feeding apparatus including a drive member, a film drum, inverse torque-to-speed responsive continuously and aperiodically yieldable means connecting said drum to said drive member, a sprocket for feeding film to and from said drum, a direct torque-to-speed responsive clutch connecting said sprocket to said drive member for varying the starting torque of the sprocket and maintaining said drive member and sprocket in fixed relation during normal operation at constant speed, and a flywheel interposed between said sprocket and said clutch for causing said clutch to slip during rapid changes in speed.

6. In a machine for recording or reproducing sound by means of a strip of flexible material having perforations therein, a sprocket for determining the speed of the said flexible strip, means for driving said sprocket, a rotating smooth surfaced drum serving to transport the film past the recording or reproducing point, inertia means connected to said drum, means for supplying power to said drum through an inverse torque-to-speed aperiodic yieldable coupling and direct torque-to-speed responsive means interposed between said sprocket and said sprocket driving means for accelerating said sprocket at a rate slower than that of said drum.

7. In a machine for recording or reproducing sound by means of a strip of flexible material having perforations therein, a sprocket for determining the speed of the said flexible strip, means for driving said sprocket, a direct torque-to-speed responsive clutch coupling said sprocket and said driving means, a rotating smooth surfaced drum serving to transport the film past the recording or reproducing point, inertia means connected to said drum, means for supplying power to said drum through an inverse torque-to-speed responsive aperiodic yieldable coupling, and means including said clutch and a flywheel for simultaneously controlling the rate of acceleration of said sprocket whereby such control of acceleration is substantially prevented from affecting said drum driving means.

EDWARD W. KELLOGG.